(12) United States Patent
Inoue et al.

(10) Patent No.: US 7,678,996 B2
(45) Date of Patent: Mar. 16, 2010

(54) HIGH HEAT-RESISTANCE RESIN COMPOSITION AND HIGH HEAT-RESISTANCE INSULATED CABLE WHICH USES THE SAME

(75) Inventors: Takashi Inoue, Yonezawa (JP); Kenichiro Fujimoto, Hitachi (JP); Kentaro Segawa, Hitachi (JP); Hitoshi Kimura, Hitachi (JP); Tomiya Abe, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/076,957

(22) Filed: Mar. 25, 2008

(65) Prior Publication Data

US 2008/0302555 A1    Dec. 11, 2008

(30) Foreign Application Priority Data

Mar. 26, 2007    (JP) .............................. 2007-078131

(51) Int. Cl.
*H01B 7/00*    (2006.01)
(52) U.S. Cl. .................................. 174/110 R
(58) Field of Classification Search ............. 174/110 R, 174/110 SR; 428/383
See application file for complete search history.

(56) References Cited

U.S. PATENT DOCUMENTS

| 5,225,482 | A | 7/1993 | Nakagawa et al. |
| 5,436,296 | A | 7/1995 | Swamikannu et al. |
| 6,242,097 | B1 * | 6/2001 | Nishiguchi et al. .......... 428/383 |
| 7,282,535 | B2 | 10/2007 | Kakeda et al. |
| 7,354,654 | B2 | 4/2008 | Masuda et al. |
| 2004/0147674 | A1 | 7/2004 | Kakeda et al. |
| 2004/0204530 | A1 | 10/2004 | Masuda et al. |
| 2007/0262483 | A1 | 11/2007 | Grasselli et al. |

FOREIGN PATENT DOCUMENTS

| JP | 9-320356 A | 12/1997 |
| JP | 2968584 B2 | 8/1999 |
| JP | 2002-343141 A | 11/2002 |
| JP | 2003-213112 A | 7/2003 |
| JP | 2003-221498 A | 8/2003 |
| JP | 2003-226798 A | 8/2003 |

(Continued)

OTHER PUBLICATIONS

T. Inoue, U.S. PTO Office Action, U.S. Appl. No. 12/018,281, dated Aug. 19, 2008, 9 pgs.

(Continued)

*Primary Examiner*—Chau N Nguyen
(74) *Attorney, Agent, or Firm*—Foley & Lardner LLP

(57) ABSTRACT

A high heat-resistance resin composition, the high heat-resistance resin composition being thermally treated at 150° C. for 100 hours, wherein a heat absorption amount of the high heat-resistance resin composition which is measured at a melting point thereof by Differential Scanning Calorimetry (DSC) is equal to or less than 45 J/g before thermal treatment, an increasing rate of the heat absorption amount of the high heat-resistance resin composition which is measured at a melting point thereof after the thermal treatment by Differential Scanning Calorimetry (DSC) is equal to or less than 20% as compared to that before the thermal treatment, and a degree of extensibility thereof is equal to or more than 200% after the thermal treatment.

8 Claims, 2 Drawing Sheets

FOREIGN PATENT DOCUMENTS

| | | | |
|---|---|---|---|
| JP | 2004-143350 | * | 5/2004 |
| JP | 3590057 | B2 | 8/2004 |
| JP | 2004-264803 | A | 9/2004 |
| JP | 3650474 | B2 | 2/2005 |
| JP | 2005-213441 | A | 8/2005 |
| JP | 2006-232977 | A | 9/2006 |
| WO | WO 91/06106 | A1 | 5/1991 |
| WO | WO 94/27298 | A1 | 11/1994 |

OTHER PUBLICATIONS

T. Inoue, U.S. PTO Notice of Allowance, U.S. Appl. No. 12/018,281, dated Jan. 23, 2009, 7 pgs.

* cited by examiner

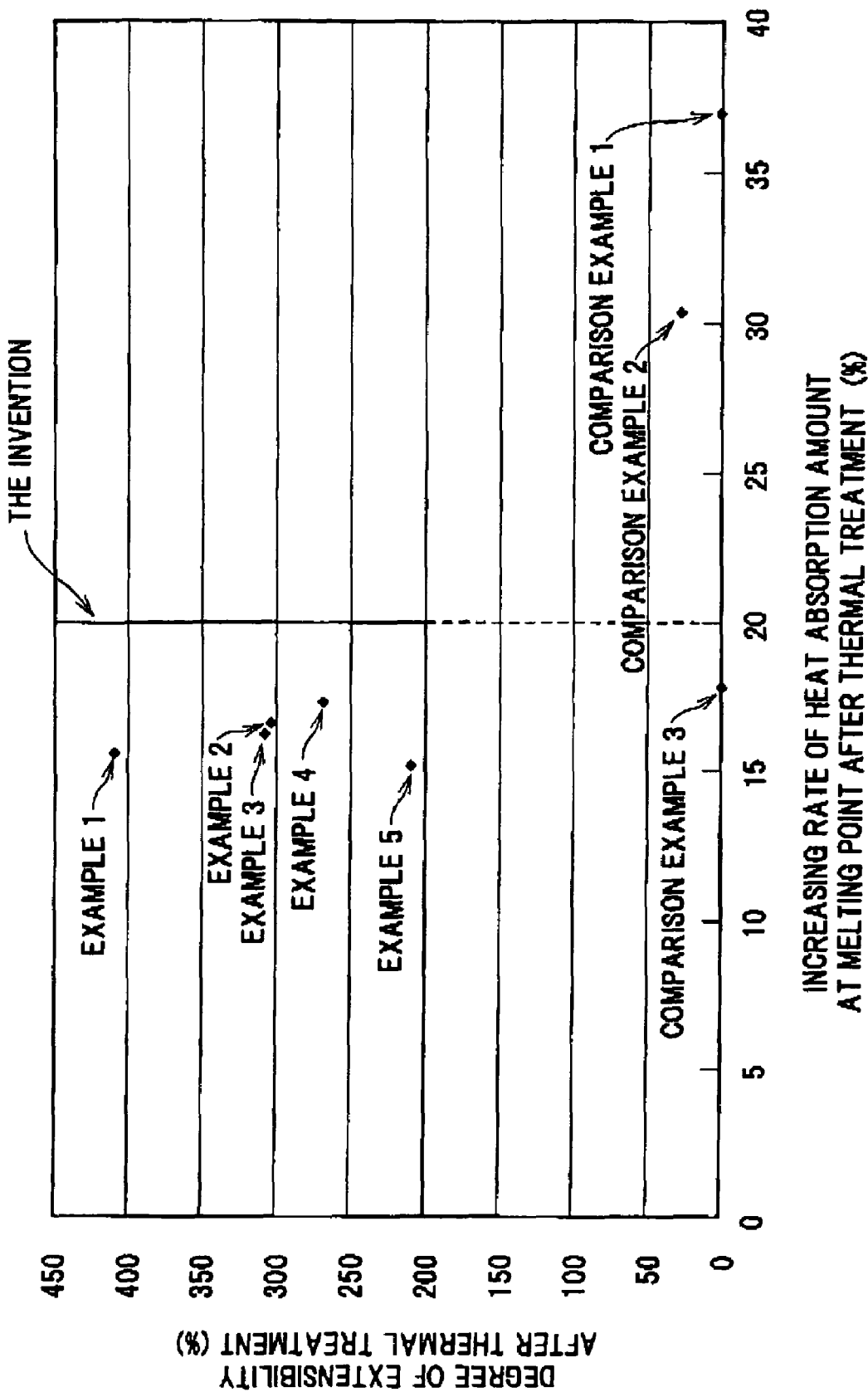

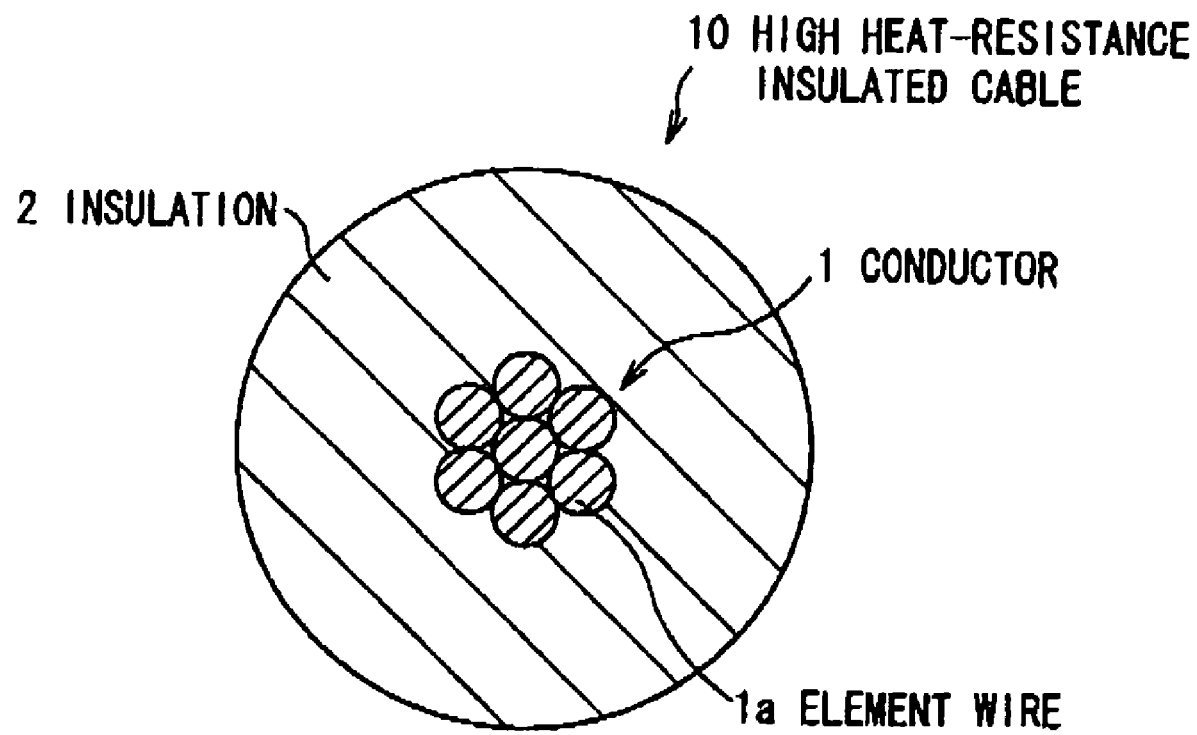

HIGH HEAT-RESISTANCE RESIN COMPOSITION AND HIGH HEAT-RESISTANCE INSULATED CABLE WHICH USES THE SAME

The present application is based on Japanese patent application No. 2007-078131 filed on Mar. 26, 2007, the entire contents of which are incorporated herein by reference.

BACKGROUND OF THE INVENTION

1. Field of the Invention

The invention relates to a high heat-resistance resin composition and a high heat-resistance insulated cable which uses the same.

2. Description of the Related Art

A conventional insulating material consisting of polyvinyl chloride (PVC) is generally used for an insulated cable. The insulating material which consists of PVC has good quality in characteristics for practical use and in price. However, a problem such as environmental contamination caused by waste disposal of the insulating material which produces gas containing chlorine or the like occurs, when the insulating material consisting of PVC is incinerates.

Further, the realization of light weight and thin thickness of an insulated cable is required in accordance with the request of light weight of a car body and the saving of a space for wiring cables in saving energy consumption in the area of transportation such as an automobile, a train or the like. In such a request of light weight and thin thickness of the insulated cable, however, there is a disadvantage in which such required characteristics as heat resistance and abrasion resistance are not realized, and so on, where the conventional PVC material is used for an insulated cable.

For these reasons, insulated materials other than PVC are required.

For responding to the requirement, in recent years, a polyester resin which is crystalline polymer is used for an insulating material. The polyester resin is used in the wide areas of an automobile, an electrical and electronic engineering, an insulating material, and OA (office automation) for the reason that the polyester resin has good quality in heat resistance, abrasion resistance, electrical property, chemical resistance leading to formability, and low water-absorbing property, and dimensional stability. This insulating material is described, for example, in the Japanese Patent No. 3650474.

A thickness of an insulation of an insulated cable for an automobile is conventionally 0.5 mm, and a thickness of the insulation of the cable is required to be thinner than a thickness of the conventional insulation by the formation of spreading an insulating material for the insulation of the cable.

There is a prospect for responding to such a request while keeping heat resistance and abrasion resistance, because a general-purpose engineering plastic represented by polyester resin has especially good quality in formability.

However, the polyester resin is a crystalline polymer, and has characteristics that heat absorption amount increases after thermal treatment, thus crystallinity degree of the crystalline polymer increases. For this reason, if the polyester resin is used for an insulating material which is spread to be formed for an insulation of an insulated cable, it is considered that a degree of extensibility of the crystalline polymer decreases. Therefor, a relation between the crystallinity degree of the crystalline polymer and the degree of extensibility thereof is important.

In addition, heat absorption amount at a melting point of a crystalline polymer that indicates a development of crystallinity of the crystalline polymer that causes a decrease of the degree of extensibility thereof, for example, is studied in some publications. Among these publications, however, bending property of the crystalline polymer and heat-sagging property that indicates a sag of a sample after thermal treatment are only studied as described in the Japanese Patent Kokai No. 2006-232977, and a recrystallization-beginning temperature of the crystalline polymer is only studied as described in the Japanese Patent Kokai No. 2004-264803, while the relation between the crystallinity degree of the crystalline polymer and the degree of extensibility thereof is not studied therein.

In order to suppress the increase of a heat absorption amount of the crystalline polymer, that is the development of a crystallinity degree of the crystalline polymer, there is a conventional technique in which monomer having bending property is added to a material of the polyester resin as described in the Japanese Patent Kokai No. 2005-213441, but the relation between the crystallinity degree of the crystalline polymer and the degree of extensibility thereof is not studied even in this publication.

As described in the above publications, although the polyester resin has good quality in formability or the like, the polyester resin is a crystalline polymer so that the crystallinity degree of the polyester resin is progressed by thermal treatment and the heat absorption amount at the melting point of the polyester resin is increased and the degree of extensibility thereof is resultantly decreased to a large extent. In addition, if the polyester resin is applied to an insulated cable, spreading formation of an insulating material which is an outer insulating layer of the insulated cable is disturbed, and the request of thin thickness of the insulating material is not realized.

SUMMARY OF THE INVENTION

Accordingly, it is an object of the invention is to provide a high heat-resistance resin composition and a high heat-resistance insulated cable in which the decrease of degree of extensibility of an insulating material is suppressed.

In general, according to a first aspect of the invention, there is provided a high heat-resistance resin composition, the high heat-resistance resin composition being thermally treated at 150° C. for 100 hours, wherein: a heat absorption amount of the high heat-resistance resin composition which is measured at a melting point thereof by Differential Scanning Calorimetry (DSC) is equal to or less than 45 J/g before thermal treatment, an increasing rate of the heat absorption amount of the high heat-resistance resin composition which is measured at a melting point thereof after the thermal treatment by Differential Scanning Calorimetry (DSC) is equal to or less than 20% as compared to that before the thermal treatment, and a degree of extensibility thereof is equal to or more than 200% after the thermal treatment.

According to a second aspect of the invention, there is provided a high heat-resistance insulated cable, comprises: a conductor; and an insulation for insulating the conductor, the insulation comprising a high heat-resistance resin composition which is thermally treated at 150° C. for 100 hours, and having a thickness of 0.1 mm to 0.5 mm, wherein: a heat absorption amount of the high heat-resistance resin composition which is measured at a melting point thereof by Differential Scanning Calorimetry (DSC) is equal to or less than 45 J/g before thermal treatment, an increasing rate of the heat absorption amount of the high heat-resistance resin composition which is measured at a melting point thereof after the thermal treatment by Differential Scanning Calorimetry (DSC) is equal to or less than 20% as compared to that before the thermal treatment, and a degree of extensibility thereof is equal to or more than 200% after the thermal treatment.

According to a third aspect of the invention, there is provided a high heat-resistance resin composition, the high heat-resistance resin composition being thermally treated at a predetermined temperature for a predetermined time, wherein: a heat absorption amount of the high heat-resistance resin composition which is measured at a melting point thereof by Differential Scanning Calorimetry (DSC) is equal to or less than 45 J/g before thermal treatment, an increasing rate of the heat absorption amount of the high heat-resistance resin composition which is measured at a melting point thereof after the thermal treatment by Differential Scanning Calorimetry (DSC) is equal to or less than 20% as compared to that before the thermal treatment, and a degree of extensibility thereof is equal to or more than 200% after the thermal treatment.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary graph showing a relation between an increasing rate of heat absorption amounts at a melting point of a high heat-resistance resin composition before and after the thermal treatment and degree of extensibility after thermal treatment in examples according to an embodiment of the high heat-resistance resin composition in the invention, and FIG. 2 is an exemplary cross-section view showing a high heat-resistance insulated cable according to an embodiment of a high heat-resistance insulated cable in the invention.

Embodiments according to the invention will be described hereinafter with reference to the accompanying drawings.

DETAILED DESCRIPTION FOR PREFERRED EMBODIMENTS OF THE INVENTION

Hereinafter, embodiments of the invention will be described in detail with reference to the accompanying drawings.

It should be noted that the present invention is not limited to the embodiments described below, and the various combinations and changes may be made without departing from or changing the technical idea of the present invention.

In an embodiment of a high heat-resistance resin composition of the invention, the high heat-resistance resin composition is one which is thermally treated at 150° C. for 100 hours, wherein a heat absorption amount of the high heat-resistance resin composition which is measured at a melting point thereof by Differential Scanning Calorimetry (DSC) is equal to or less than 45 J/g before thermal treatment, an increasing rate of the heat absorption amount of the high heat-resistance resin composition which is measured at the melting point thereof by Differential Scanning Calorimetry (DSC) is equal to or less than 20% after the thermal treatment as compared to that before the thermal treatment, and a degree of extensibility thereof is equal to or more than 200% after the thermal treatment.

The high heat-resistance resin composition comprises polyester resin, hydrogenerated block copolymer hydrogenated with block copolymer of styrene and diene compound to be saturated, a polyolefin, a compound including glycidyl, or a compound including polyolefin and glycidyl. Here, the compound including glycidyl is used as binder. In addition, the high heat-resistance resin composition may include other additives, for example, a pigment or the like. The other additives may be used for improving and adjusting forming processability and physicality of formed products under the condition that its amount does not affect required characteristic features of the high heat-resistance resin composition.

[Polyester Resin]

For the above described polyester resin, various sorts of compounds may be used, especially, polyethylene terephthalate (PET), polybutylene terephthalate (PBT), and polybutylene isophthalate are desirable to be used.

An amount of the polyester resin included in the high heat-resistance resin composition ranges preferably from 50 percent to 80 percent by weight, and ranges preferably from 70 percent to 80 percent by weight. If the amount of the polyester resin ranges over 80 percent by weight, a degree of crystallinity of the high heat-resistance resin composition is slightly suppressed as compared to that of the polyester resin as a simple substance. However, the effect of suppressing the crystallinity is not sufficient to result in the determination of mechanical characteristics after thermal treatment. On the other hand, if the amount of the polyester resin ranges under 50 percent by weight, such good quality as heat resistance, mechanical strength, electrical property, chemical resistance, etc. which are essentially provided by polyester is deteriorated.

[Hydrogenerated Block Copolymer]

The hydrogenerated block copolymer described above is one in which double bonds which exist in a block copolymer of a styrene and diene compound as styrene elastomer is hydrogenated to be saturated. For the diene compound described above, butadiene, isoprene or the like may be used. For the block copolymer described above, styrene-butadiene block copolymer such as styrene-butadiene-styrene block copolymer (SBS), styrene-butadiene-styrene rubber copolymer (SBR) or the like, and styrene-isoprene block copolymer such as styrene-isoprene-styrene block copolymer (SIS), styrene-isoprene-rubber copolymer (SIR) or the like may be used.

In addition, the block copolymer described above may be modified by organic carboxylate, if required.

An amount of the styrene elastomer included in the high heat-resistance resin composition ranges preferably from 10 percent to 30 percent by weight. If the amount of the styrene elastomer ranges over 30 percent by weight, a proportion of the polyester resin included in the high heat-resistance resin composition decreases, so that such good quality as heat resistance, mechanical strength, electrical property, chemical resistance, etc. which are essentially provided by polyester is deteriorated. On the other hand, if the amount of the styrene elastomer ranges under 10 percent by weight, effects as provided by a soft component are decreased, so that it is concerned that flexibility of the high heat-resistance resin composition is deteriorated.

[Polyolefin]

For the polyolefin described above, low-density polyethylene may be used.

An adding amount of a polyolefin composition in the high heat-resistance resin composition ranges preferably from 10 percent to 30 percent by weight. If the amount of the polyolefin ranges over 30 percent by weight, a proportion of the polyester resin included in the high heat-resistance resin composition decreases, and such good quality as heat resistance, mechanical strength, electrical property, chemical resistance, etc. which are essentially provided by polyester is deteriorated. On the other hand, if the amount of the polyolefin composition ranges under 10 percent by weight, mechanical property of the high heat-resistance resin composition after thermal treatment is lowered.

[Compound Including Glycidyl]

For the compound including the glycidyl described above, triglycidyl cyanurate, monoaryl diglycidyl cyanurate, ethylene-glycidyl methacrylate copolymer, etc. may be is used, among which the ethylene-glycidyl methacrylate copolymer is especially desirable.

An adding amount of the compound including glycidyl in the high heat-resistance resin composition ranges preferably from 10 percent to 30 percent by weight. If the amount of the compound including glycidyl ranges over 30 percent by weight, reactive property of the high heat-resistance resin composition increases in a kneading process thereof, a melted viscosity thereof increases, and the high heat-resistance resin composition becomes hard to be kneaded. On the other hand, if the amount of the compound including glycidyl ranges under 10 percent by weight, a degree of crystallinity of the high heat-resistance resin composition is suppressed as compared to polyester as a simple substance. However, the effect of suppressing the crystallinity is not sufficient, and mechanical property of the high heat-resistance resin composition after thermal treatment is lowered.

[Nitrogen-Containing Compound]

For the nitrogen-containing compound described above, for example, melamine cyanurate, melamine, cyanuric acid, isocyanuric acid, triazine derivative, isocyanurate derivative, etc. may be used, among which melamine cyanurate is especially desirable.

The melamine cyanurate is used as particles for the nitrogen-containing compound, and it may as well be whether its surface is treated by surface preparation agent such as coupling agent (aminosilane coupling agent, epoxysilane coupling agent, vinylsilane coupling agent or the like), high fatty acid (stearic acid, oleic acid or the like) or the like, or its surface is not treated.

An adding amount of the nitrogen-containing compound in the high heat-resistance resin composition ranges from 5 phr to 40 phr per 100 phr of the polyester resin, and ranges preferably from 5 phr to 30 phr. If the amount of the nitrogen-containing compound ranges not over 40 phr, abrasion resistance of the high heat-resistance resin composition is not lowered. On the other hand, if the amount of the nitrogen-containing compound does not range not under 5 phr, sufficient heat resistance of the high heat-resistance resin composition is attained.

[Other Additives]

For the other additives described above, for example, antioxidizing agent, toughening agent, bulking agent, heat stabilizer, ultraviolet absorber, lubricant, pigment, colorant, plasticizing agent, crystal nucleating agent, anti-hydrolytic agent may be used.

[Physicality Value of High Heat-Resistance Resin Composition]

A physicality value measured in the high heat-resistance resin composition will now be described below. Heat absorption amount of the high heat-resistance resin composition described below is measured by the Differential Scanning Calorimetry (DSC).

The heat absorption amount of the high heat-resistance resin composition at a melting point thereof is equal to or less than 45 J/g before thermal treatment. A degree of extensibility of the high heat-resistance resin composition is originally low before the thermal treatment, and becomes lower in accordance with the proceeding of crystallinity thereof after the thermal treatment, when the upper limitation such as 45 J/g is not exceeded.

When the high heat-resistance resin composition described above is thermally treated at 150° C. for 100 hours, an increasing rate of the heat absorption amount of the high heat-resistance resin composition at a melting point thereof is equal to or less than 20% after the thermal treatment as compared to that before the thermal treatment.

FIG. 1 is an exemplary graph showing a relation between an increasing rate of heat absorption amount at a melting point of the high heat-resistance resin composition after thermal treatment as compared to that before the thermal treatment and a degree of extensibility thereof after the thermal treatment, wherein the results are obtained by examples according to an embodiment of the invention as described later. As clearly shown in FIG. 1, examples 1 to 5 of the invention meet the requirements in which an increasing rate of heat absorption amount at a melting point of a high heat-resistance resin composition in the embodiment of the invention is equal to or less than 20% after thermal treatment as compared to that before the thermal treatment, and a degree of extensibility thereof is equal to or more than 200%. The high heat-resistance resin composition which meets the requirements can be used as a thin insulating material of light weight for an insulated cable or the like, because the progress of crystallinity is suppressed in the crystallinity of polyester resin to such an extent that the extensibility of the insulating material is not hindered, so that a degree of extensibility thereof is not extremely lowered, and a stretching property thereof is not deteriorated.

On the other hand, comparison examples 1 to 3 do not meet the requirements as clearly shown in FIG. 1.

The examples 1 to 5 and the comparison examples 1 to 3 will be explained later.

[High Heat-Resistance Insulated Cable which Uses High Heat-Resistance Resin Composition]

According to one embodiment of the invention, a high heat-resistance insulated cable comprises an insulation formed on a conductor, wherein high heat-resistance resin composition is melted to be extruded on the conductor. The high heat-resistance insulated cable is, for example, used for transportation such as an automobile, a train or the like.

The conductor may consist of a single copper or aluminum wire, or stranded or braided copper or aluminum wires. The wire(s) may be plated with tin or the like by molten or electrolytic plating.

In addition, a thickness of the insulation which is consisting of the high heat-resistance resin composition as a covering layer of the insulated cable ranges preferably from 0.1 mm to 0.5 mm, and more preferably from 0.1 mm to 0.3 mm. If the thickness of the insulation ranges not over 0.5 mm, it is effected that the high heat-resistance insulated cable becomes light in weight and thin in thickness. In addition, if the thickness of the insulation ranges not under 0.1 mm, it is realized that the high heat-resistance insulated cable keeps abrasion resistance.

On the other hand, a diameter of the conductor ranges preferably from 0.5 mm to 2 mm. A cross-sectional shape of the conductor may be a circular shape or a non-circular shape such as a rectangular shape which is formed from a copper plate by slit processing, or from a round wire by rolling.

FIG. 2 shows a high heat-resistance insulated cable in an embodiment according to the invention. The high heat-resistance insulated cable comprises a copper conductor 1 containing seven copper element wires 1a, and an insulation 2 containing the high heat-resistance resin composition. For instance, the insulation 2 is of 0.2 mm thickness.

[Effects of High Heat-Resistance Resin Composition and High Heat-Resistance Insulated Cable which Uses the Same in Embodiment of Invention]

According to the high heat-resistance resin composition and the high heat-resistance insulated cable which uses the same as described in the embodiments of the invention, the below described effects will be expected.

The high heat-resistance resin composition which has flexibility such as extensibility is obtained, even after it is thermally treated. When this high heat-resistance resin composition is used for an insulation of an insulated cable or the like, the insulated cable becomes light in weight and thin in thickness. If the insulated cable is applied to a car body such as an automobile, a train or the like, it is realized that the automobile, the train or the like become light in weight, and the space for wiring an insulated cable becomes smaller.

EXAMPLES

Hereinafter, the examples 1 to 5 of the invention will be described with reference to TABLE 1, wherein abbreviated words are explained below.
PBT: polybuthylene terephthalate
SEBS: PS-polyethylene/buthylene-PS triblock copolymer
LLDPE: linear low-density polyethylene
EGMA: ethylene-glycidyl methacrylate copolymer In TABLE 1, physicality measurements in the description of the invention are carried out by means described below.

(1) Measurements of Heat Absorption Amount at Melting Point

A heat absorption amount of samples used in the examples to be cut into small pieces is measured at a melting point of the samples under the condition at a rate of temperature increase of 10° C./min by Differential Scanning Calorimetry (DSC-7 made by Perkin-Elmer).

In TABLE 1, a symbol of "o" in "EVALUATION OF MEASUREMENT RESULTS OF HEAT ABSORPTION AMOUNT" represents meeting the requirements in which a heat absorption amount of the samples is equal to or less than 45 J/g before thermal treatment and an increasing rate of the heat absorption amount of the samples after the thermal treatment is equal to or less than 20% as compared to the heat absorption amount before the thermal treatment, and a symbol of "x" represents not meeting the requirements.

The increasing rate of the heat absorption amount of the samples is calculated by an expression 1 described below.

INCREASING RATE OF HEAT ABSORPTION AMOUNT OF SAMPLE(%)=[(HEAT ABSORPTION AMOUNT AFTER THERMAL TREATMENT)−(HEAT ABSORPTION AMOUNT BEFORE THERMAL TREATMENT)]×100/(HEAT ABSORPTION AMOUNT BEFORE THERMAL TREATMENT)      (EXPRESSION 1)

(2) Test of Extensibility after Thermal Treatment

A degree of extensibility of tubular samples used in the examples is measured under the condition that the samples are left at a room temperature for 12 hours after thermal treatment at 150° C. for 100 hours in a constant-temperature bath, wherein a size of the samples is 1.9 mm in outer diam-

TABLE 1

| | CONTENTS OF RESIN COMPOSITION (wt %) | | | | | HEAT ABSORPTION AMOUNT (J/g) | | |
|---|---|---|---|---|---|---|---|---|
| | PBT | SEBS | LLDPE | EGMA | MELAMINE CYANURATE (phr) | BEFORE THERMAL TREATMENT | AFTER THERMAL TREATMENT | INCREASING RATE (%) |
| EXAMPLE 1 | 70 | 20 | 5 | 5 | — | 36.8 | 42.6 | 15.8 |
| EXAMPLE 2 | 70 | 20 | 10 | — | — | 36.9 | 43.1 | 16.8 |
| EXAMPLE 3 | 70 | 20 | — | 10 | — | 36.5 | 42.5 | 16.4 |
| EXAMPLE 4 | 80 | 10 | — | 10 | — | 40.1 | 47.1 | 17.5 |
| EXAMPLE 5 | 70 | 20 | 5 | 5 | 15 | 35.2 | 40.6 | 15.3 |
| COMPARISON EXAMPLE 1 | 100 | — | — | — | — | 48.1 | 65.8 | 36.8 |
| COMPARISON EXAMPLE 2 | 80 | 20 | — | — | — | 42.9 | 55.6 | 30.3 |
| COMPARISON EXAMPLE 3 | 90 | — | — | 10 | — | 47.4 | 55.5 | 17.9 |

| | EXTENSIBILITY (%) AFTER THERMAL TREATMENT | EVALUATION OF MEASUREMENT RESULTS(1) OF HEAT ABSORPTION AMOUNT | EVALUATION OF MEASUREMENT RESULTS(2) OF EXTENSIBILITY |
|---|---|---|---|
| EXAMPLE 1 | 410 | o | o |
| EXAMPLE 2 | 305 | o | o |
| EXAMPLE 3 | 310 | o | o |
| EXAMPLE 4 | 270 | o | o |
| EXAMPLE 5 | 210 | o | o |
| COMPARISON EXAMPLE 1 | 0 | x | x |
| COMPARISON EXAMPLE 2 | 30 | x | x |
| COMPARISON EXAMPLE 3 | 0 | o | x | eter, 10.3 mm in inner diameter, and 150 mm in length, and a velocity of extension is at 200 nm/min in accordance with JIS C 3005 WL1. In TABLE 1, a symbol of "o" in "EVALUATION OF MEASUREMENT RESULTS OF HEAT ABSORPTION AMOUNT" represents meeting requirements in which a degree of extensibility of the samples is equal to or more than 200%, and a symbol of "x" represents not meeting the requirements.

The degree of extensibility of the samples is calculated by an expression 2 described below.

DEGREE OF EXTENSIBILITY OF SAMPLE(%)= [(LENGTH OF SAMPLE AFTER TEST OF EXTENSIBILITY)−(LENGTH OF SAMPLE BEFORE TEST OF EXTENSIBILITY)]×100/ (LENGTH OF SAMPLE BEFORE TEST OF EXTENSIBILITY)   (EXPRESSION 2)

Example 1

In accordance with a composing ratio of contents as indicated in TABLE 1, hydrogenated block copolymer (SEBS) is blended into polybutylene trephthalate (PBT), and a composition thus obtained is then added with polyolefin (LLDPE) and binder (EGMA) to provide an intended composition. The composition is melted and kneaded by a two-axis extruding machine at 260° C., and an extruded composition is crushed to provide rice-grain sized pellets, and the pellets are dried at 120° C. for 10 hours by a vacuum drier.

Next the resin composition obtained by processes described above is extruded to cover a tin-plated soft copper of 1.3 mm in diameter by a thickness of 0.3 mm.

Since then, the copper wire is removed from the extruded covering layer to provide the above described tubular samples for the examples. The measurement results (1) and (2) in TABLE 1 are obtained by using the tubular samples.

Example 2

In accordance with contents indicated in TABLE 1, samples are prepared in the same composition, but excluding the binder (EGMA). The measurement results (1) and (2) in TABLE 1 are obtained by using the tubular samples.

Example 3

In accordance with contents indicated in TABLE 1, samples are prepared in the same composition, but excluding the polyolefin (LLDPE). The measurement results (1) and (2) in TABLE 1 are obtained by using the tubular samples.

Example 4

In accordance with contents indicated in TABLE 1, samples are prepared in the same composition, but excluding the polyolefin (LLDPE). The measurement results (1) and (2) in TABLE 1 are obtained by using the tubular samples.

Example 5

In accordance with contents indicated in TABLE 1, samples are prepared in the same composition further including melamine cyanurate. The measurement results (1) and (2) in TABLE 1 are obtained by using the tubular samples.

The samples of the high heat-resistance resin composition for the examples 1 to 5 are represented by a symbol "o" in the measurement results (1) and (2), wherein all of the samples meet the formerly described requirements as shown by the symbol "o".

Comparison Example 1

In accordance with contents indicated in TABLE 1, samples are prepared in the same composition, but excluding the hydrogenerated block copolymer (SEBS), the polyolefin (LLDPE) and the binder (EGMA). The measurement results (1) and (2) in TABLE 1 are obtained by using the tubular samples.

Comparison Example 2

In accordance with contents indicated in TABLE 1, samples are prepared in the same composition, but excluding the polyolefin (LLDPE) and the binder (EGMA). The measurement results (1) and (2) in TABLE 1 are obtained by using the tubular samples.

Comparison Example 3

In accordance with contents indicated in TABLE 1, samples are prepared in the same composition, but excluding the hydrogenerated block copolymer (SEBS) and the polyolefin (LLDPE). The measurement results (1) and (2) in TABLE 1 are obtained by using the tubular samples.

The samples of the high heat-resistance resin composition for the comparison example 1 are represented by a symbol "x" in the measurement results (1) and (2), wherein the symbol "x" means not meeting the formerly described requirements.

The samples of the high heat-resistance resin composition for the comparison example 2 are represented by a symbol "x" in the measurement results (1) and (2), wherein the symbol "x" means not meeting the formerly described requirements.

The samples of the high heat-resistance resin composition for the comparison example 3 are represented by a symbol "x" in the measurement result (2), wherein the symbol "x" means not meeting the formerly described requirements.

It should be noted that the present invention is not limited to the embodiment described above, and the various combinations and changes may be made without departing from or changing the technical idea of the present invention.

What is claimed is:

1. A high heat-resistance resin composition, comprising:
   where the high heat-resistance resin composition is subject to a thermal treatment at 150° C. for 100 hours,
   a heat absorption amount of the high heat-resistance resin composition which is measured at a melting point thereof by Differential Scanning Calorimetry (DSC) being equal to or less than 45 J/g before the thermal treatment;
   an increasing rate of the heat absorption amount of the high heat-resistance resin composition which is measured at a melting point thereof after the thermal treatment by Differential Scanning Calorimetry (DSC) being equal to or less than 20% as compared to that before the thermal treatment; and
   a degree of extensibility thereof being equal to or more than 200% after the thermal treatment,
   wherein the high heat-resistance resin composition further comprises:

polyester resin;
PS-polyethylene/buthylene-PS triblock copolymer; and
polyolefin and/or a compound including glycidyl.

2. A high heat-resistance resin composition according to claim 1, wherein
the polyester resin comprises polybutylene isophthalate.

3. A high heat-resistance resin composition according to claim 1, wherein
the polyolefin comprises low-density polyethylene.

4. A high heat-resistance resin composition according to claim 1, further comprising melamine cyanurate.

5. A high heat-resistance resin composition according to claim 1, wherein
the high heat-resistance resin composition is used for an insulation of an insulated cable.

6. A high heat-resistance insulated cable, comprising:
a conductor; and
an insulation for insulating the conductor having a thickness of 0.1 mm to 0.5 mm,
the insulation comprising a high heat-resistance resin composition comprising:
where the high heat-resistance resin composition is subject to a thermal treatment at 150° C. for 100 hours,
a heat absorption amount of the high heat-resistance resin composition which is measured at a melting point thereof by Differential Scanning Calorimetry (DSC) being equal to or less than 45 J/g before the thermal treatment;
an increasing rate of the heat absorption amount of the high heat-resistance resin composition which is measured at a melting point thereof after the thermal treatment by Differential Scanning Calorimetry (DSC) being equal to or less than 20% as compared to that before the thermal treatment; and
a degree of extensibility thereof being equal to or more than 200% after the thermal treatment,
wherein the high heat-resistance resin composition further comprises:
polyester resin;
PS-polyethylene/buthylene-PS triblock copolymer; and
polyolefin and/or a compound including glycidyl.

7. A high heat-resistance resin composition, comprising:
where the high heat-resistance resin composition is subject to a thermal treatment at a predetermined temperature for a predetermined time,
a heat absorption amount of the high heat-resistance resin composition which is measured at a melting point thereof by Differential Scanning Calorimetry (DSC) being equal to or less than 45 J/g before the thermal treatment;
an increasing rate of the heat absorption amount of the high heat-resistance resin composition which is measured at a melting point thereof after the thermal treatment by Differential Scanning Calorimetry (DSC) being equal to or less than 20% as compared to that before the thermal treatment; and
a degree of extensibility thereof is equal to or more than 200% after the thermal treatment,
wherein the high heat-resistance resin composition further comprises:
polyester resin;
PS-polyethylene/buthylene-PS triblock copolymer; and
polyolefin and/or a compound including glycidyl.

8. A high heat-resistance resin composition according to claim 7, wherein
the thermal treatment of the high heat-resistance resin composition is carried out at 140 to 160° C. for 90 to 110 hours.

* * * * *